Dec. 10, 1968   G. EBLE, JR   3,415,085
LOCK FOR TRUCK TRAILER
Filed June 1, 1966

INVENTOR
GEORGE EBLE, JR.
BY Hofgren, Wegner, Allen, Stellman & McCord
ATTORNEYS United States Patent Office 3,415,085
Patented Dec. 10, 1968

3,415,085
LOCK FOR TRUCK TRAILER
George Eble, Jr., 101 W. 126th Place, Chicago,
Ill. 60628
Filed June 1, 1966, Ser. No. 554,466
1 Claim. (Cl. 70—232)

ABSTRACT OF THE DISCLOSURE

A device for preventing theft of tractor trailers, the device having a shroud for covering the grooved king pin of such trailers and a locking member for detachably securing the shroud about the king pin.

Specification

This invention relates to locking devices and more particularly to a novel lock device for a truck trailer.

Truck trailers of the type which are pulled by, and separable from, truck tractor units are frequently parked with a loaded cargo while awaiting coupling to a tractor unit or during transfer from one tractor unit to another. Often these trailers may be parked for a relatively long duration of time over the course of one or more days. While parked in large lots with a loaded cargo, these trailers are extremely vulnerable to theft in that they may be easily transported away by anyone who has a tractor unit after access has been gained to the parking or storage lot and attendant personnel, if any, have been overpowered or otherwise subdued.

This invention is directed to a means for rendering a truck trailer incapable of coupling to a truck tractor and more particularly to a means for attachment to the king pin of the truck trailer mounting plate, said means being removable only by authorized persons such as to render the trailer incapable of being coupled to a truck tractor by unauthorized persons.

It is therefore a primary object of this invention to provide a new lock for a truck trailer to prevent coupling attachment of the trailer to a truck tractor.

It is another object of this invention to provide a member which may be attached to the king pin of a truck trailer so as to prevent unauthorized coupling attachment of the truck trailer to a truck tractor.

A further object of this invention is to provide a member for attachment to the king pin of a truck trailer having lock means for locking the member to the king pin and permitting removal therefrom, attachment of the member to the king pin of the trailer rendering the trailer incapable of coupling attachment to a truck trailer.

Other objects, features and advantages of the present invention will be apparent from the following description of the preferred embodiments illustrated in the accompanying drawings, in which.

Figure 1:
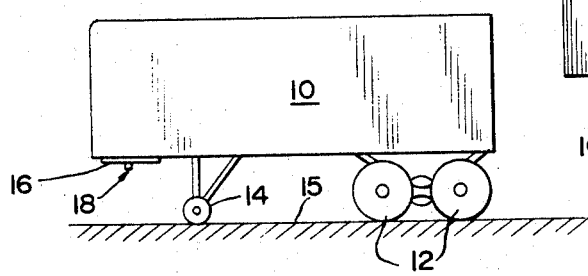
FIGURE 1 is a side elevational view of a truck trailer with which the lock of this invention is used.
Figure 2:
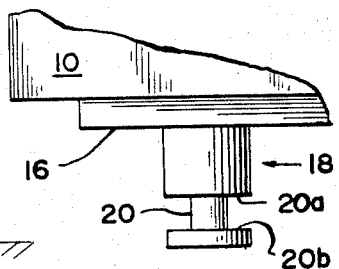
FIGURE 2 is a fragmentary enlarged view of the mounting plate area at the forward end of the truck trailer and showing the king pin of the trailer.

As shown in FIGURE 1, a truck trailer 10 is generally provided with tandem wheels 12 at the rear end thereof and auxiliary supporting wheels 14 which are utilized to maintain the trailer supported on a parking surface 15 in a parked condition when the trailer is not coupled to a truck tractor unit. The forward end of the trailer is provided with a mounting plate 16 which is sometimes referred to as a "fifth wheel," positioned on the underside of the trailer affording a generally horizontal bearing surface.

A king pin 18 projects downwardly from the approximate center of the mounting plate. When the trailer is coupled to tractor unit, the king pin extends through an opening in a companion mounting plate (not shown) of a tractor unit to afford a means for pivotally attaching the tractor and trailer relative to each other. These king pins are typically provided with an annular groove 20 near the free end providing a pair of spaced annular shoulders 20a and 20b. Generally all dimensions of these king pins are standardized so that a lock means designed to accommodate a king pin, such as shown in the drawings, can be utilized for universal attachment to all truck trailers.

Figure 4:
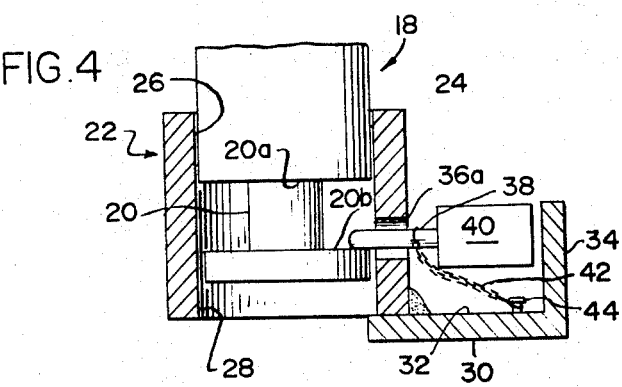
FIGURE 4 is a vertical section view of the lock of this invention, secured to the king pin of a trailer.
Figure 3:
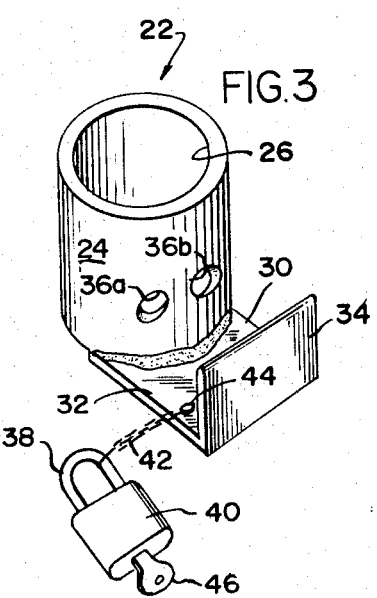
FIGURE 3 is a perspective view of one form of the lock device of this invention.

Lock means 22 shown in FIGURES 3 and 4 includes a generally circular cylindrical hollow sleeve 24 made of a heavy metal, such as cast iron or steel. The sleeve is provided with top and bottom open ends 26 and 28, respectively, to adapt the sleeve to be telescoped over the king pin 18, it being understood that the inner diameter of the sleeve is slightly greater than the outer diameter of the king pin.

The lock is also provided with an L-shaped base 30 including a platform portion 32 which extends laterally outwardly from the edge of the sleeve portion 24 near open end 28. End wall 34 extends uprightly from platform 32 and forms a partial enclosure in combination with the platform and sleeve.

The sleeve 24 is provided with latch element passage portions, which includes two closely spaced openings 36a and 36b, for the reception of the latch element, abutment portion or curved locking shackle 38 of a lock element or lock member; preferably a standard padlock 40. In operation, the lock means may be telescoped on the king pin to a point where openings 36a and 36b are generally in alignment with groove 20. To assist in this registration, the overall length of the sleeve 24 could be such that when the end 26 abuts the underside of mounting pad 16, the openings 36a and 36b would be registered with groove 20. When so registered, the shackle 38 of padlock 40 is hooked through openings 36a and 36b so that a portion of the padlock rests within groove 20 and is confined between annular shoulders 20a and 20b. With the padlock then locked in the usual fashion, it can be seen that lock means 22 will be held on the king pin thereby rendering the trailer incapable of coupling attachment to a tractor unit.

The padlock 40 may be secured by means of chain 42 to a post 44 on base 30 to prevent accidental misplacement of the padlock. A key 46 is utilized to open the padlock in the usual fashion. It will be noted that when the lock means 22 is locked on the king pin 18, the partial enclosure formed by sleeve 24, platform 32 and end wall 34, in combination with the close proximity to the mounting plate 16 makes it extremely difficult for unauthorized persons to obtain tampering access to the padlock, thereby thwarting efforts to remove the lock means by prying or striking the padlock with foreign instruments.

Figure 5:
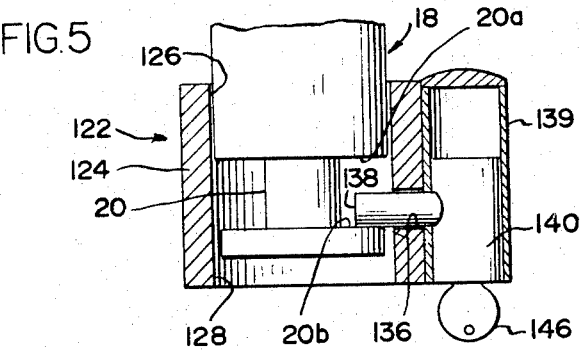
FIGURE 5 is a vertical section view of one modified form of the lock of this invention secured to the king pin of a trailer.

A modified lock means 122 is shown in FIGURE 5. Lock means 122 also includes a hollow circular cylindrical sleeve 124 having open ends 126 and 128. However, the sleeve is provided with a single side wall opening 136 for the reception of bolt 138 of a tumbler-type lock 140 held in housing 139. The sleeve is telescoped over the king pin in the previously described fashion until bolt 138 is aligned groove 20. Then the tumbler 140 is actuated by means of key 146 so that bolt 138 projects into groove 20 to hold lock means 122 on king pin 18. Reverse turning of tumbler 140 by key 146 will withdraw bolt 138 from groove 20 and permit removal of lock means 122 from pin 18.

Figure 6:
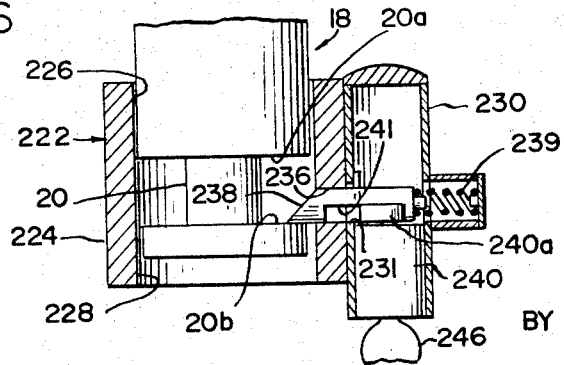
FIGURE 6 is a vertical section view of another modified form of the lock of this invention secured to the king pin of a trailer.

A further modified form of the invention, lock means 222, is illustrated in FIGURE 6. Lock means 222 includes a circular cylindrical sleeve 224 having open ends 226 and 228. Lock means 222 is provided with a lock housing 230 having opening 231 and an aligned opening 236 in sleeve 224. Bolt 238 is positioned in housing 230 and normally urged by spring means 239 outwardly from openings 231 and 236 so that when the lock means 222 is telescoped on king pin 18, the bolt automatically projects into groove 20. Bolt 238 may be retracted from groove 20 against the urging of spring 239 by engagement of eccentric portion 240a of tumbler 240 responsive to actuation of the tumbler by key 246. Bolt 238 is longitudinally notched at 241 to receive eccentric portion 240a and to permit lateral retracting movement of the bolt relative to the eccentric when the sleeve is first telescoped over the king pin and the bolt retracts to ride over the lower end of the king pin.

Lock means 22, 122 and 222 are rotatably mounted relative to the king pin 18, in annular groove 20. However, engagement of shoulder 20b with latch element 38, 138 and 238, respectively, holds the lock means on the pin. One advantage of the rotatable mounting is that attempts at tampering with lock means are futile in that the lock means will merely spin about the king pin when struck with a foreign instrument.

This invention provides a lock means for rendering a tractor trailer incapable of coupling attachment to a tractor truck without removal of the lock means by authorized personnel. Through the simple attachment of the lock means of this invention, the king pin of the truck trailer cannot be telescoped through the mating opening of a truck tractor. The structure of this lock means is extremely simple but virtually foolproof in its operation. Thus, with the aid of this invention, truck trailers may be parked in storage areas and now be invulnerable to theft by being towed away by a truck tractor. Keys for unlocking the lock means and removing it from the king pin may be maintained at a point remote from the truck parking area so that the keys will not be available to those who overpower or subdue personnel in attendance at the trailer parking lot.

The foregoing detailed description has been given for clearness of understanding only, and no unnecessary limitations should be understood therefrom, as some modifications may be obvious to those skilled in the art.

I claim:
1. A theft preventing shroud for enclosing an annularly grooved cylindrical king pin of a truck trailer vehicle, comprising: a generally cylindrical sleeve member of substantially uniform inner diameter being open at its upper and lower ends and of an inner diameter to closely surround the major portion of the king pin in an annular groove enclosing position, said sleeve member having a bolt receiving opening in the side wall thereof positioned to lie adjacent the annular groove of the king pin when the sleeve member is telescoped thereover; and a generally circular cylindrical sleeve housing in generally tangential abutment with and secured to the exterior of the sleeve member along an axis generally parallel to the axis of the sleeve member and overlying the bolt opening therein, the sleeve housing having a bolt opening therein in alignment with the bolt receiving opening in the sleeve member, said housing having an open lower end adjacent the open lower end of the sleeve member; and a locking member positioned in the open lower end of the sleeve housing, the locking member including a lock tumbler in operative engagement with a movable lock bolt, the lock bolt being positioned in alignment with the bolt receiving opening in the sleeve member and in the sleeve housing and movable between an extended, locking position, and a retracted, release position so that movement of the lock tumbler will move the lock bolt through said openings into and out of locking position.

References Cited
UNITED STATES PATENTS

| | | | |
|---|---|---|---|
| 2,554,306 | 5/1951 | Mack | 230—438 |
| 2,630,698 | 3/1953 | Morrow | 79—232 |
| 2,630,699 | 3/1953 | Langdon | 70—232 |
| 2,641,124 | 6/1953 | Gallagher et al. | 70—232 |
| 2,706,392 | 4/1955 | Lucas et al. | 70—232 |
| 2,755,655 | 7/1956 | Maffey | 70—232 |

FOREIGN PATENTS 639,737    6/1964    Canada.

MARVIN A. CHAMPION, *Primary Examiner.*

R. L. WOLFE, *Assistant Examiner.*